United States Patent
Chen et al.

(10) Patent No.: US 11,126,230 B1
(45) Date of Patent: Sep. 21, 2021

(54) MECHANISM FOR SECURING AND DOCKING AN ADAPTER CARD IN A COMPUTER CHASSIS

(71) Applicant: QUANTA COMPUTER INC., Taoyuan (TW)

(72) Inventors: Chao-Jung Chen, Taoyuan (TW); Chih-Hsiang Lee, Taoyuan (TW); Po-Chen Liu, Taoyuan (TW); Hsun Yeh, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/934,601

(22) Filed: Jul. 21, 2020

Related U.S. Application Data

(60) Provisional application No. 63/010,930, filed on Apr. 16, 2020.

(51) Int. Cl.
*G06F 1/18* (2006.01)

(52) U.S. Cl.
CPC .............. *G06F 1/185* (2013.01); *G06F 1/181* (2013.01)

(58) Field of Classification Search
CPC ........................................................ G06F 1/18
See application file for complete search history.

(56) References Cited

U.S. PATENT DOCUMENTS

| | | | |
|---|---|---|---|
| 7,220,138 B2 * | 5/2007 | Miyamoto | G06K 13/08 439/159 |
| 2005/0030721 A1 * | 2/2005 | Shimada | G11B 33/126 361/726 |

\* cited by examiner

*Primary Examiner* — Jerry Wu
(74) *Attorney, Agent, or Firm* — Nixon Peabody LLP

(57) ABSTRACT

A gear assembly for securing an adapter card in a computer chassis includes a guide rail receiver, a gear system, and a lever. The guide rail receiver is configured to receive a guide rail coupled to an adapter card module for docking an adapter card to an electrical connector to a motherboard. The gear system is coupled to the guide rail. The lever is coupled to the gear system. The lever includes an open position to allow the adapter card module to be inserted and removed from the computer chassis, and a closed position to dock an adapter card to the electrical connector.

16 Claims, 8 Drawing Sheets

MECHANISM FOR SECURING AND DOCKING AN ADAPTER CARD IN A COMPUTER CHASSIS

CROSS-REFERENCE TO RELATED APPLICATION

This application claims priority under 35 U.S.C. § 119 to U.S. Provisional Application No. 63/010,930, entitled "TWO ORIENTATION HOT PLUG DEVICE DESIGN", filed on Apr. 16, 2020. The contents of that application are hereby incorporated by reference in their entirety.

FIELD OF THE INVENTION

The present invention relates to securing an adapter card. More specifically, the present invention relates to methods and devices for securing and docking adapter cards in a computer chassis.

BACKGROUND

Adapter cards include any internal expansion cards of a computer that allow communication with another peripheral. Examples of adapter cards can include network cards, video cards, multimedia cards, and other I/O cards. An adapter card is typically a printed circuit board plugged into an expansion slot on the computer motherboard that adds functionality to a computer system. Adapter cards typically have connectors for external cables.

Replacement and installations of adapter cards in a computer typically require opening the chassis and connecting cables from the adapter card to a printer circuit board that further connects to the motherboard. Furthermore, a typical adapter card module that includes the adapter card requires sufficient space to allow a technician access for the installation process.

Accordingly, there is a need for increasing the efficiency in the building and servicing of adapter cards for computer devices.

SUMMARY

According to one embodiment, a gear assembly for securing an adapter card in a computer chassis includes a guide rail receiver, a gear system, and a lever. The guide rail receiver is configured to receive a guide rail coupled to an adapter card module for docking an adapter card to an electrical connector to a motherboard. The gear system is coupled to the guide rail. The lever is coupled to the gear system. The lever includes an open position to allow the adapter card module to be inserted and removed from the computer chassis and a closed position to dock an adapter card to the electrical connector.

In a further aspect of the embodiment, the adapter card is positioned horizontally during the docking of the adapter card module to the guide rail. In another aspect of the embodiment, the electrical connecter to the motherboard is an expansion slot or a riser board. In yet another aspect, the adapter card module has a bracket for holding the adapter card and for connecting the guide rail to the adapter card module. In another aspect of the embodiment, the gear system comprises an elongated first gear rack meshed with one or more pinion gears. The one or more pinion gears is each meshed with one or more second gear racks positioned perpendicular to the first gear rack. In another aspect of the embodiment, one or more of the second gear racks are coupled to the guide rail receiver. In yet another aspect of the embodiment, the lever is coupled to the gear system via gear teeth disposed at a pinned end of the lever that engage the gear system.

According to another embodiment, a method for docking an adapter card to a motherboard in a computer chassis includes placing a guide rail disposed on the side of an adapter card module in a guide rail receiver secured to a gear assembly. The guide rail is slid in a first direction along the guide rail receiver. The adapter card module translates from a first position, at least partially on an exterior of the computer chassis, to a second position fully within the computer chassis, such that an electrical connector of an adapter card in the adapter card module is positioned adjacent a connector to a motherboard. A lever mechanism coupled to the gear assembly is rotated to translate the adapter card to a locked position that couples the adapter card with the connector.

A further aspect of the embodiment includes rotating the lever mechanism to an unlocked position decoupling the adapter card from the connector to the motherboard. Another aspect of the embodiment includes sliding the guide rail in a second opposite direction along the guide rail receiver, such that the adapter card module translates from the second position to a third position, thereby allowing removal of the adapter card module from the computer chassis. In another aspect of the embodiment, the adapter card is positioned horizontally during the sliding of guide rail along the guide rail receiver. In yet another aspect of the embodiment, the coupling of the adapter card to the motherboard is via an expansion slot or via a riser board. In a further aspect of the embodiment, the adapter card module includes a bracket for holding the adapter card and for connecting the guide rail to the adapter card module. In another aspect of the embodiment, the translation of the adapter card to the locked position includes an elongated first gear rack meshed with and rotating one or more pinion gears. The one or more pinion gears are each meshed with one or more second gear racks positioned perpendicular to the first gear rack, thereby causing the adapter card to couple with the connector to the motherboard. In another aspect of the embodiment, one or more of the second gear racks are coupled to the guide rail receiver. In yet another aspect of the embodiment, the lever mechanism is coupled to the gear assembly by gear teeth disposed at a pinned end of the lever mechanism that engage the gear assembly.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

Figure 1:
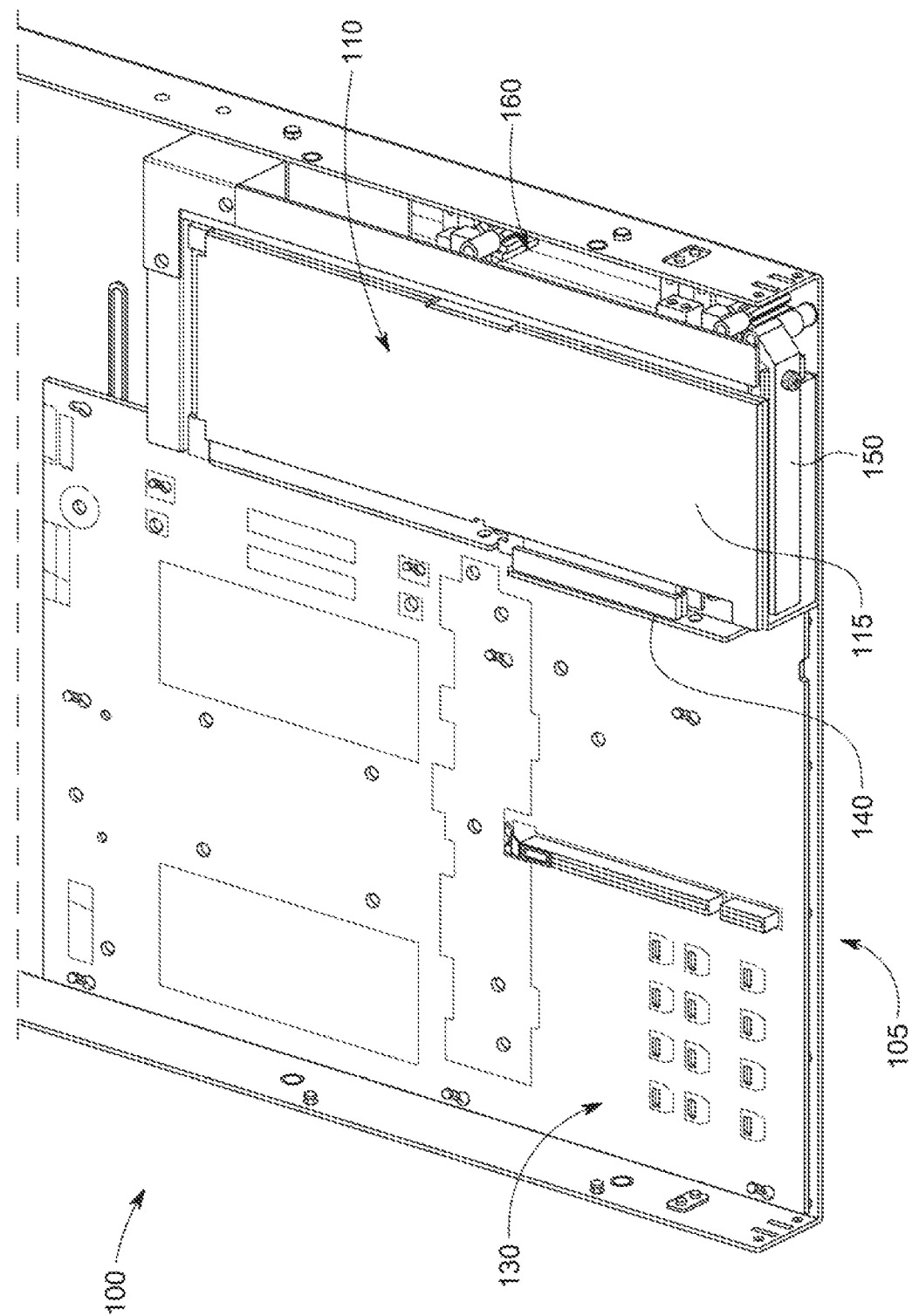
FIG. 1 is a perspective view of an adapter card module secured and docked inside a computer chassis, according to some implementations of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The various embodiments are described with reference to the attached figures, where like reference numerals are used throughout the figures to designate similar or equivalent elements. The figures are not drawn to scale, and they are provided merely to illustrate the instant invention. It should be understood that numerous specific details, relationships, and methods are set forth to provide a full understanding. One having ordinary skill in the relevant art, however, will readily recognize that the various embodiments can be practiced without one or more of the specific details, or with other methods. In other instances, well-known structures or operations are not shown in detail to avoid obscuring certain aspects of the various embodiments. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at,", "near," or "nearly at," or "within 3-5% of," or "within acceptable manufacturing tolerances," or any logical combination thereof, for example.

With regards to the present disclosure, the terms "computing device" or "computer device" or "computing system" or "computer system" refer to any electronically-powered or battery-powered equipment that has hardware, software, and/or firmware components, where the software and/or firmware components can be configured, for operating features on the device. The term "operating environment" can refer to any operating system or environment that functions to allow software to run on a computer system.

It would be desirable to increase efficiency in the manufacturing and servicing of computer devices that include adapter cards by, minimizing the need for tools to aid the securing and removal of the cards. It would further be desirable for a system to more efficiently provide a connection of adapter cards to a motherboard.

In some aspects of the present disclosure, a mechanism is described for securing and removing an adapter card in a computer chassis. In some implementations, the mechanism further docks and undocks the adapter card from an electrical connection to a motherboard. The described mechanism does so without, the need for screws, tools, or other fastening systems that are not otherwise directly a part of the computer chassis. The described mechanisms can desirably allow a hot plug of an adapter card to a connector to the motherboard where the adapter card module, in which the adapter card is disposed, uses minimal space within the computer chassis. In some implementations, this can be accomplished by mechanisms allowing the adapter card to be slid into the chassis and connected to a connector to the motherboard via horizontal docking.

In some implementations, an adapter card module, including an adapter card, can be inserted and removed from the chassis by sliding the adapter card module along a rail, where a lever, at the front of the chassis and coupled to a gear assembly, is in an open position. After the adapter card module is slid into the chassis to be aligned in a docking position, the lever can then be rotated to a closed position. The rotation activates the gear assembly and causes the adapter card to translate horizontally to dock with the connector inside the chassis that is connected to the motherboard.

Turning now to FIG. 1, a perspective view of an adapter card module 110 secured and docked inside a computer chassis 100 is depicted. The computer chassis 100 includes a motherboard 130 that is connected to an adapter card 115, located within the adapter card module 110, when the adapter card 115 is docked to a riser card 140 or other electrical connecter to the motherboard 130.

In some implementations, the adapter card 115 and adapter card module 110 are positioned horizontally within the computer chassis 100. The horizontal orientation provides a compact, space-saving layout within the computer chassis 100. The horizontal orientation of the adapter card module 110 can also allow the adapter card 115 to be docked via access to a front side 105 or back side (not shown) of the computer chassis 100. This allows the adapter card module 110 to be slid into the computer chassis 100, without the need to open the chassis housing (not shown) or the need for additional space to dock the adapter card 115, such as where cables or interfaces need to be manually connected.

A rotating lever 150 is coupled to a gear assembly 160 connected to the computer chassis 100. The rotating lever 150 is depicted in a closed or locked position in FIG. 1 where the adapter card module 110 is fully contained within the computer chassis 100, and the adapter card 115 is docked to an electrical connection, such as a riser card 140, to the motherboard. As discussed in more detail below, the rotating lever 150 and gear assembly 160 belong to a system for securing the adapter card module 110 and docking the adapter card 115 within the computer chassis 100.

Figure 2A:
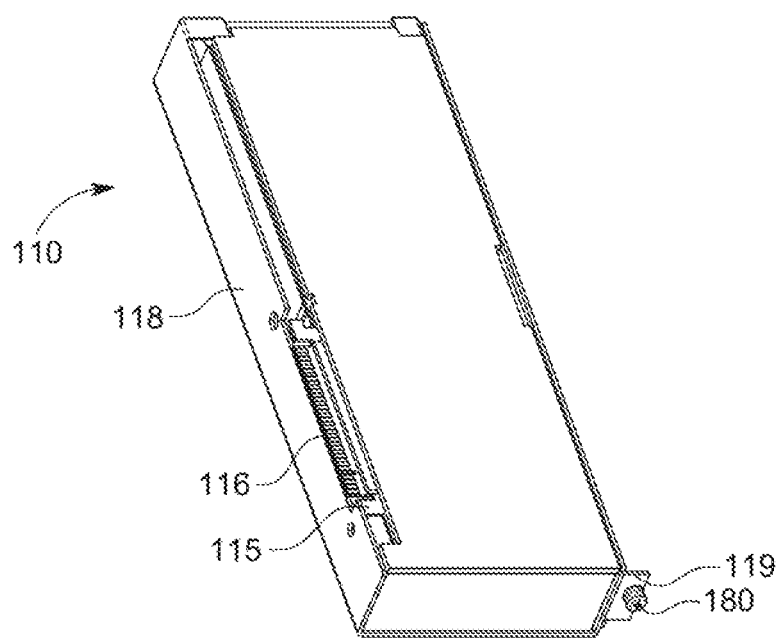
FIGS. 2A and 2B are a right and left perspective views of the adapter card module in FIG. 1, according to some implementations of the present disclosure.
Figure 2B:
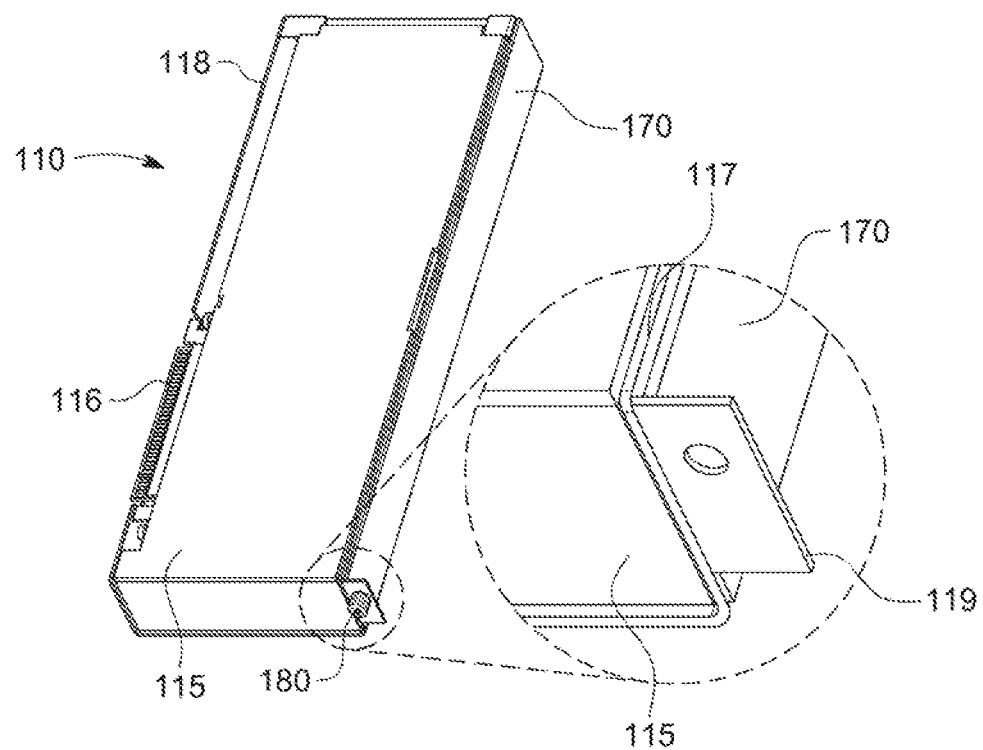

Turning to FIGS. 2A and 2B, right and left perspective views of the adapter card module 110 in FIG. 1 are depicted. The adapter card module 110 includes an adapter card 115 placed in a bracket 118. The adapter card 115 includes an electrical interface 116 that docks to an electrical connector connected to the motherboard. The bracket 118 can include a lateral extension 119 to aid in securing the bracket 118, via a mechanical fastener 180, to a computer chassis. In some implementations, the adapter card module 110 includes a guide rail 170 connected to a side wall 117 of the bracket 118. The guide rail 170 aids with sliding the adapter card module 110 into and out of the computer chassis.

Figure 3A:
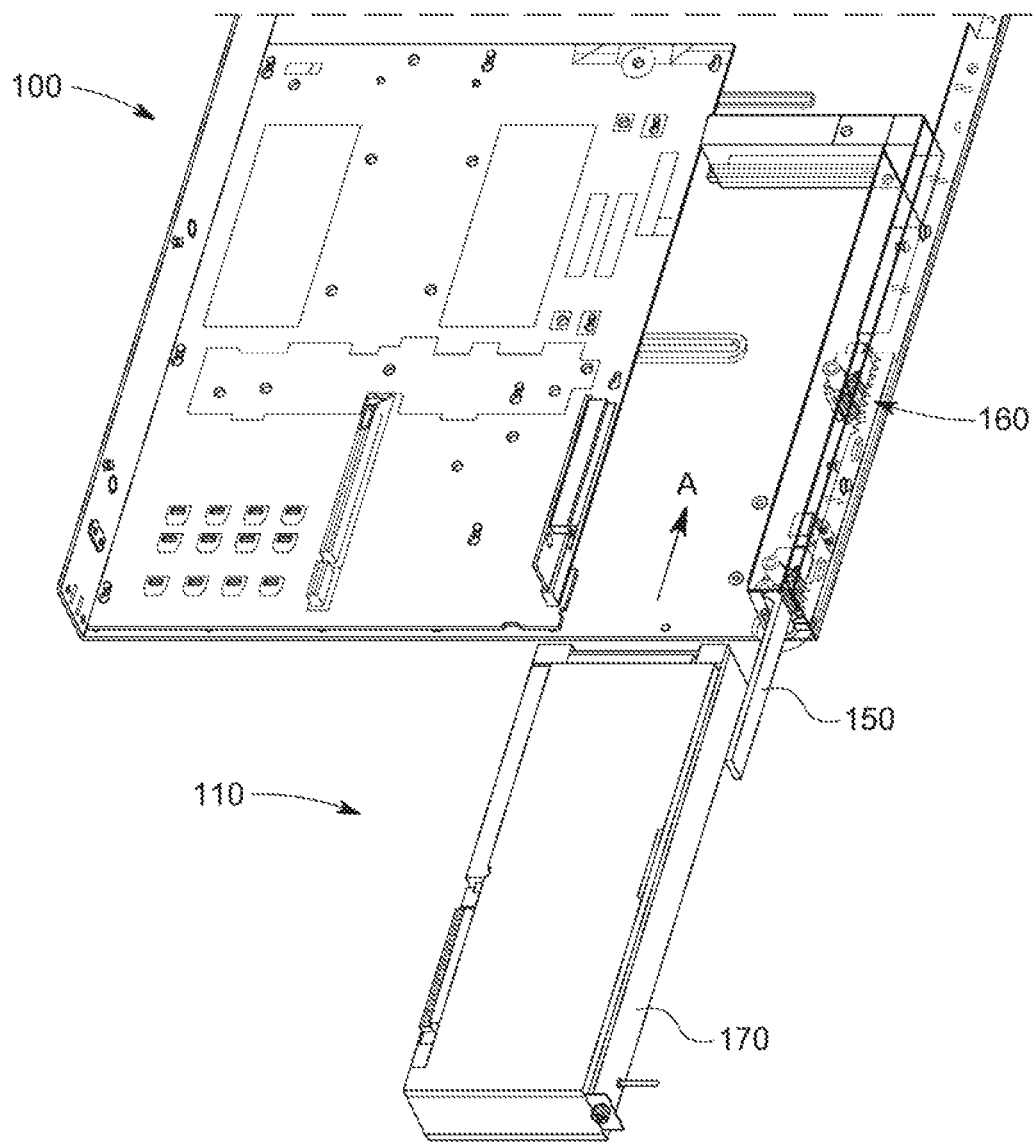
FIGS. 3A and 3B are right and left perspective views of the computer chassis with adapter card module of FIG. 1 prior to the adapter card module being inserted into the computer chassis, according to some implementations of the present disclosure.
Figure 3B:
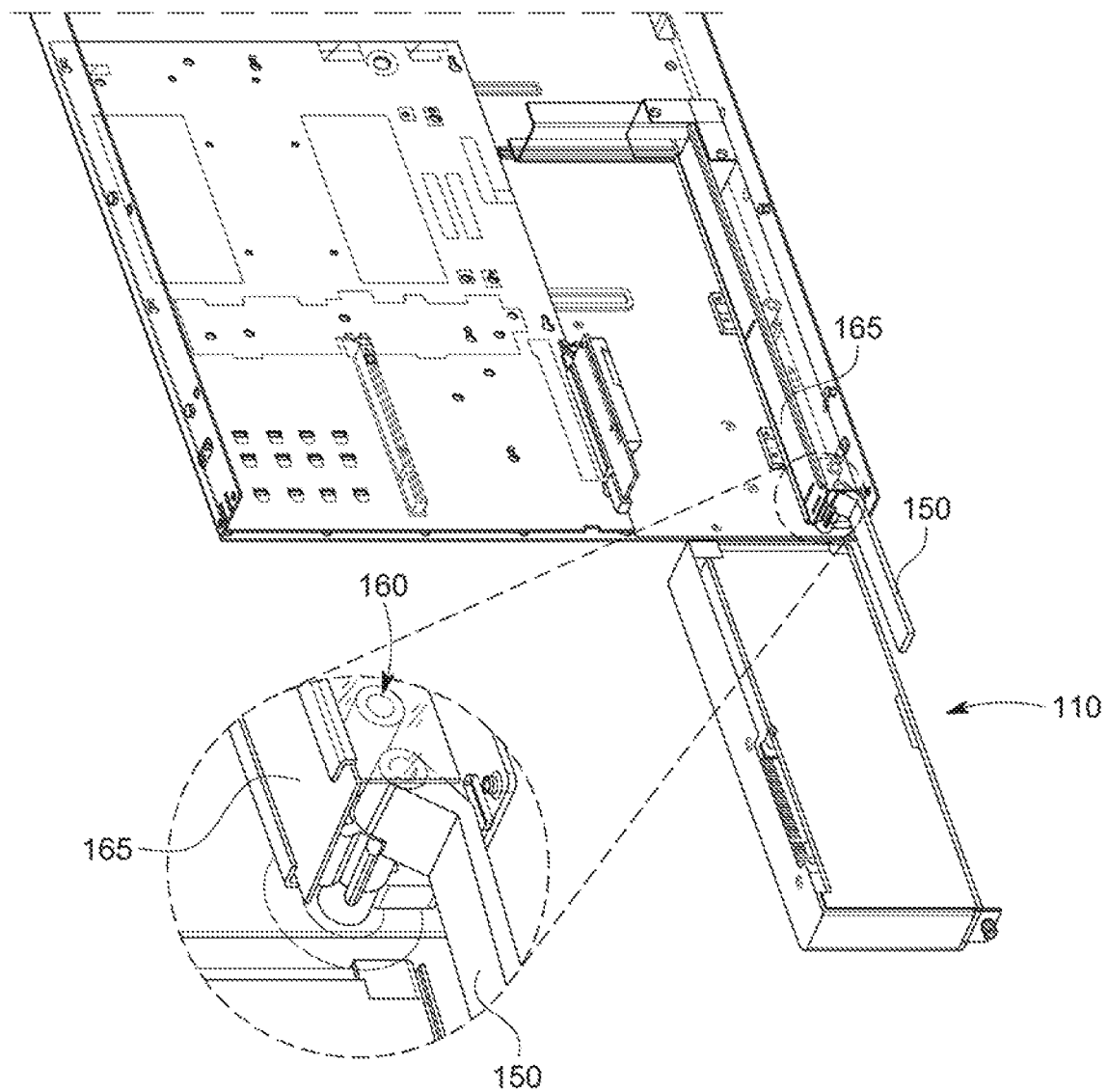

Turning now to FIGS. 3A and 3B, left and right perspective views of the computer chassis 100 with the adapter card module 110 of FIG. 1 are depicted, prior to the adapter card module 100 being inserted into the chassis 100. The rotating lever 150 is depicted in an open position allowing the adapter card module 110 to be inserted into the computer chassis 100 in direction A, or removed from the computer chassis 100 by sliding the adapter card module 110 in a direction opposite direction A. The lever 150 is coupled to the gear assembly 160, and both the lever and gear assembly are connected to the computer chassis 100. The gear assembly 160 is further connected to a guide rail receiver 165 that receives the guide rail 170; and allows the adapter card module 110 to translate along the guide rail receiver 165 and slide into and out of the computer chassis 100. In some implementations, the guide rail receiver 165 has a female configuration, and the guide rail 170 has a male configuration. In some implementations, the configurations of the guide rail receiver and guide rail may be transposed with the guide rail receiver having a male configuration, and the guide rail having a female configuration.

Figure 4:
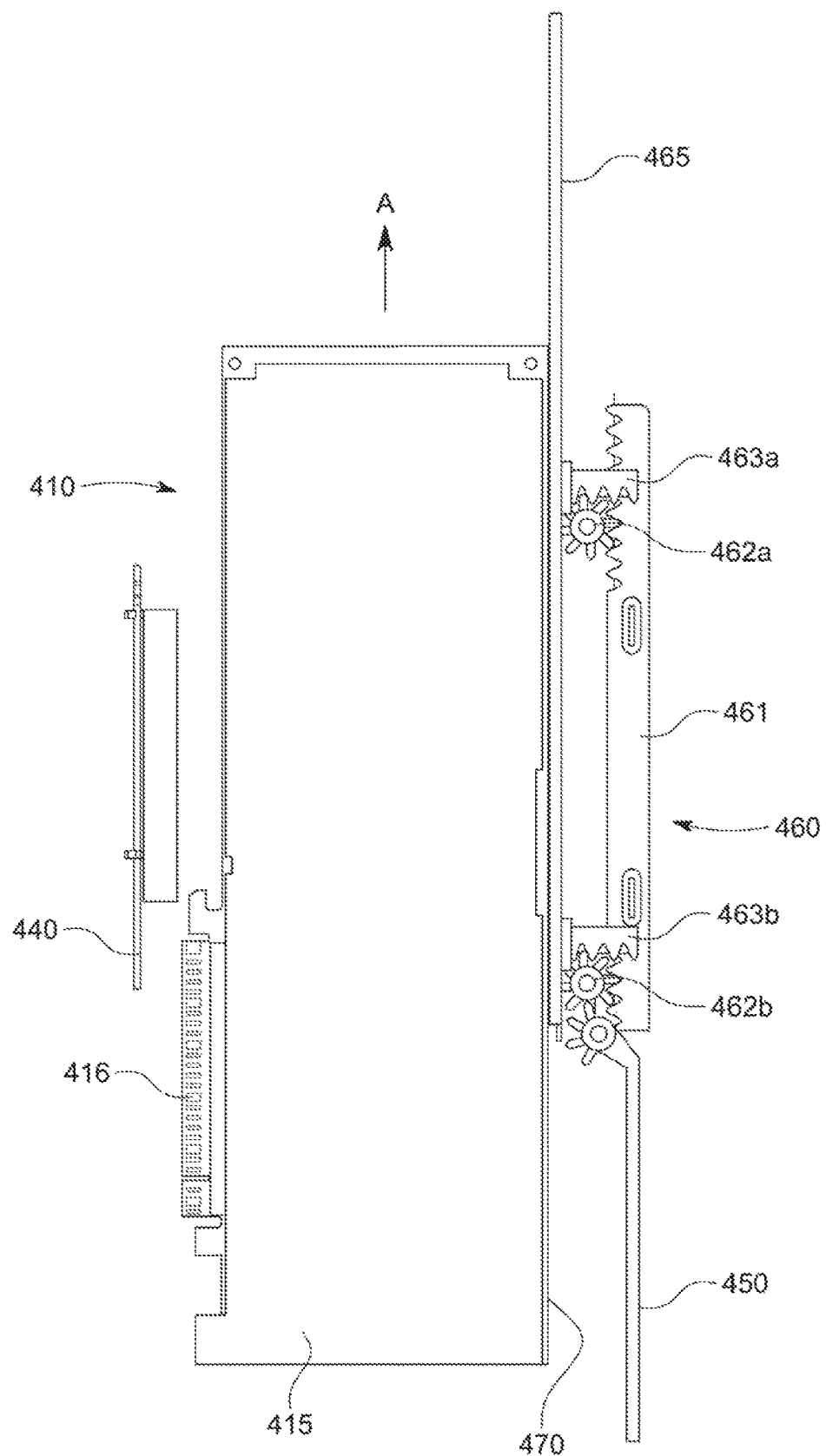
FIG. 4 is a top view of an adapter card module and a gear assembly as the adapter card module is inserted into a computer chassis, according to some implementations of the present disclosure.

FIG. 4 is a simplified top view of the system of FIG. 3, including an adapter card module 410, a gear assembly 460, and a rotating lever 450, as the adapter card module 410 is inserted in direction A into a computer chassis, such as computer chassis 100 (in FIG. 3A). The adapter card module 410 includes an adapter card 415 with an electrical interface 416 that is configured to dock or hot plug into an electrical connector, such as riser card 440, that is connected to a motherboard. The gear assembly 460 and coupled lever 450 are fastened or otherwise secured to the computer chassis 110.

In some implementations, the gear assembly 460 includes an elongated gear rack 461 meshed with one or more pinion gears, such as pinion gears 462a, 462b. The one or more pinions gears, such as pinion gears 462a, 462b, are each further meshed with a second gear rack, such as second gear racks 463a, 463b, positioned perpendicular to the elongated gear rack 461. As illustrated in the example of gear racks 463a, 463b, the second gear racks can be coupled to the guide rail receiver 465.

The elongated gear rack 461 translates back and forth along direction A using a sliding connection (not shown) that allows the single-axis translation, while also securing the elongated gear rack to the computer chassis. Similarly, the second gear rack(s), such as gear racks 463a, 463b, translate back and forth along an axis defined by direction B (see FIGS. 5 and 6). The second gear rack(s) also have a sliding connection (no shown) to the computer chassis that allows a single-axis translation perpendicular to direction A and the elongated gear rack 461.

Figure 5:
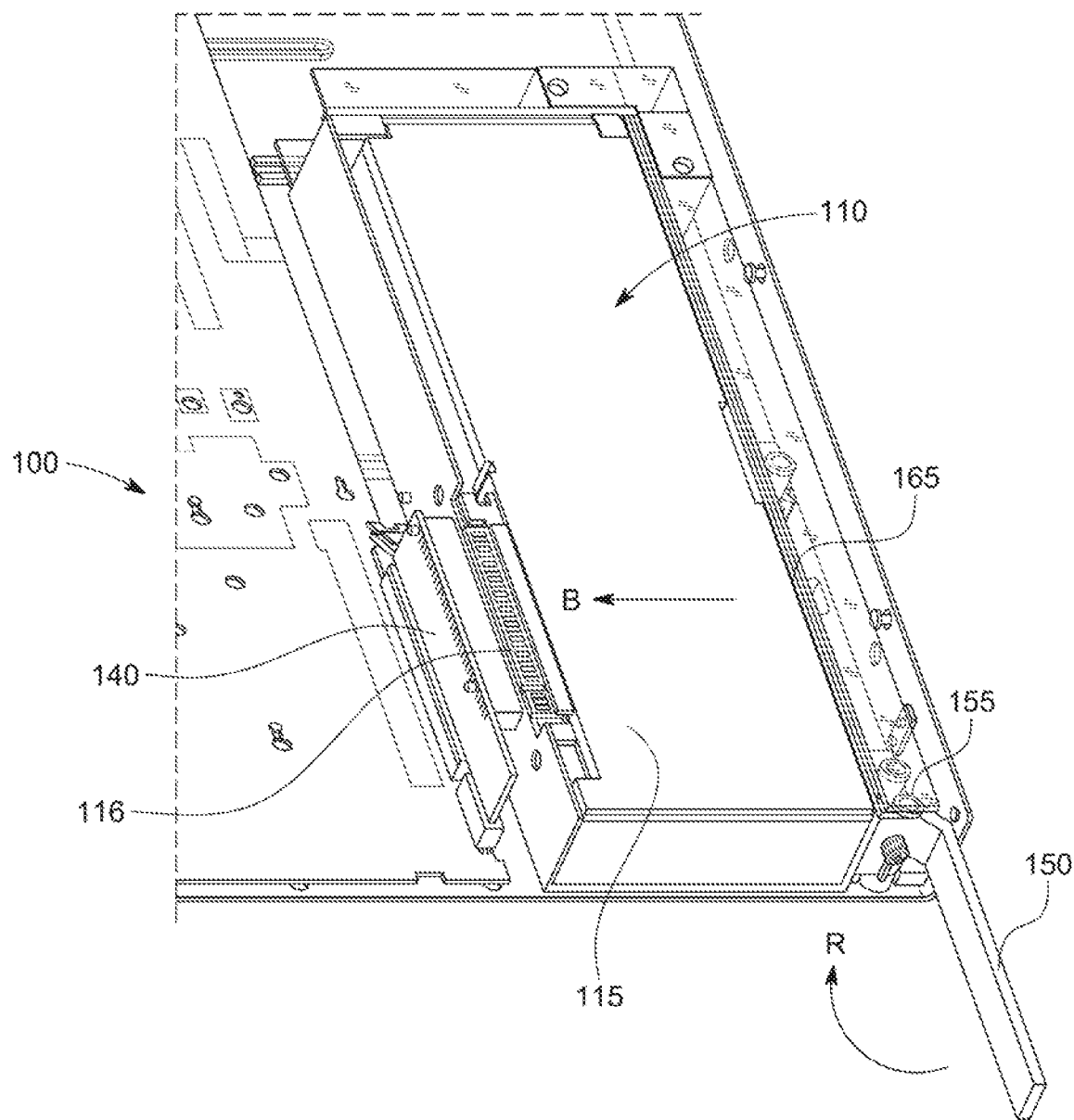
FIG. 5 is a perspective view of the adapter card module fully inserted into the chassis prior to docking the adapter card to a riser card, according to some implementations of the present disclosure.

FIG. 5 is a perspective view of the adapter card module 110 fully inserted into the computer chassis 100 immediately prior to initiating docking of the adapter card 115 to a riser card 140. After the adapter card module 110 is fully inserted, the rotating lever 150 is actuated from the depicted open position, about pinned connection 155, in the direction of arrow R, which causes the gear assembly 160 to translate the adapter card module 110, including adapter card 115, in direction B, The translations of the adapter card 115 in direction B causes the electrical interface 116 to dock with riser card 140, or other electrical connecters to the motherboard.

Figure 6:
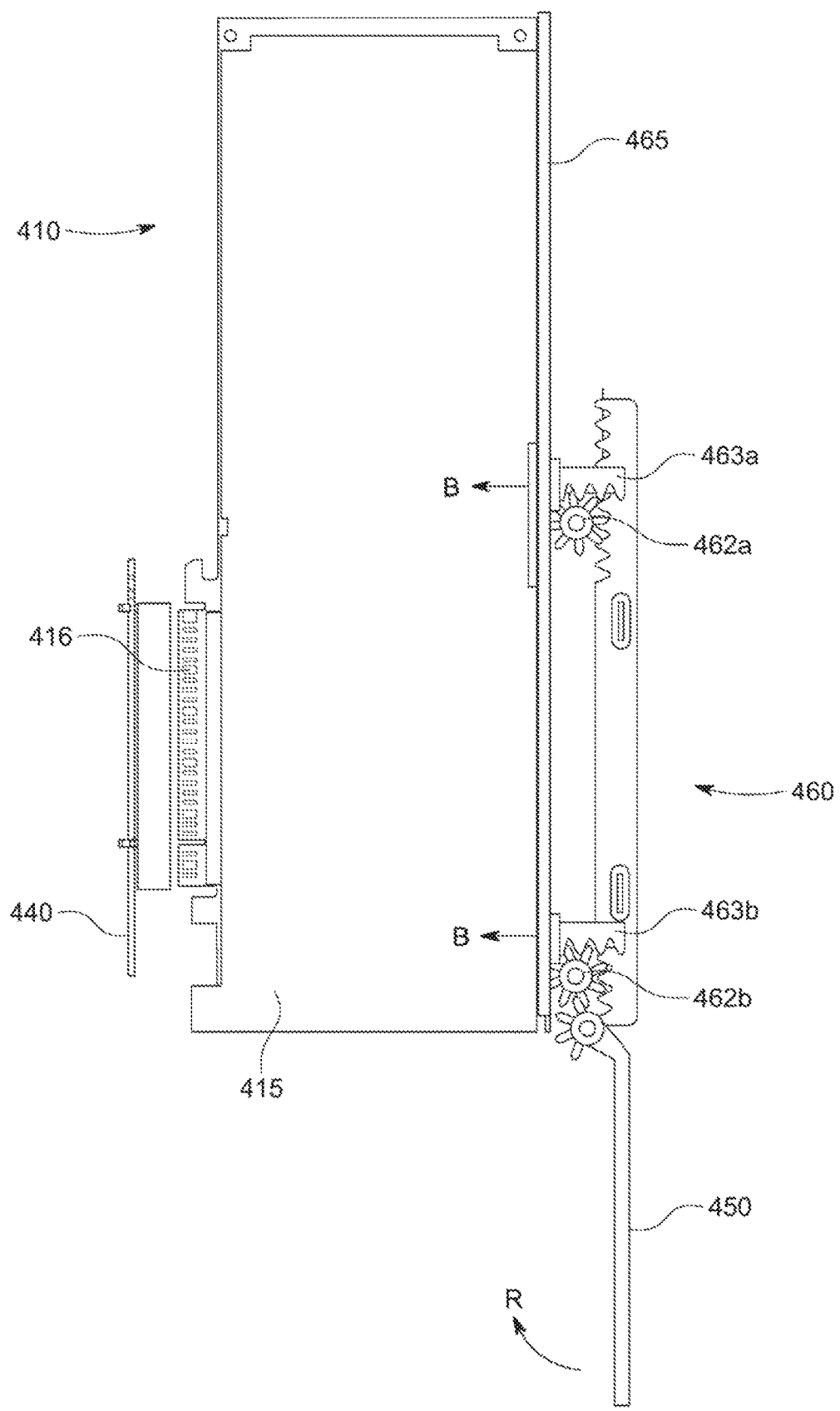
FIG. 6 is a top view of an adapter card module and the gear assembly with the adapter card module fully inserted into the chassis prior to docking the adapter card to the riser card, according to some implementations of the present disclosure.

FIG. 6 is a simplified top view of the system of FIG. 5, including an adapter card module 410 and a gear assembly 460 with a rotating lever 450, with the adapter card module 410 fully inserted into a chassis, such as computer chassis 100 (in FIG. 5). FIG. 6 further depicts the system immediately prior to docking the adapter card 415 to the riser card 440.

The adapter card module 410 includes the adapter card 415 with the electrical interface 416 having been translated along direction A (see FIGS. 3A and 4) via guide rail 470 (see element 170 in FIG. 3A and element 470 in FIG. 4). The guide rail (not shown) is connected to the adapter card module 110 and is inserted into the guide rail receiver 465. The adapter card 415 is translated until the electrical interface 416 aligns for docking, or a hot plug, into an electrical connector, such as riser card 440, that is connected to a motherboard. Upon actuation of the rotating lever 450 in direction R, the gear assembly 460 translates the adapter card 415 in direction B.

In some implementations, actuation of the lever 450 in direction R causes the elongated gear rack 461 to translate along direction A (see FIG. 4). The lever 450 is meshed with the pinion gear 462b, which is meshed with second gear rack 463b and the elongated gear rack 461. The rotation of lever 450 causes pinion gear 462b to rotate, which near simultaneously causes the translation of the elongated gear rack 461. The translation of the elongated gear rack 461 near simultaneously further causes the meshed pinion gear 462a to rotate, which causes meshed second gear rack 463a to begin translating in direction B. Also near simultaneously, the rotation of lever 450 causes pinion gear 462b to rotate, which causes meshed second gear rack 463b to also begin translating in direction B.

Figure 7:
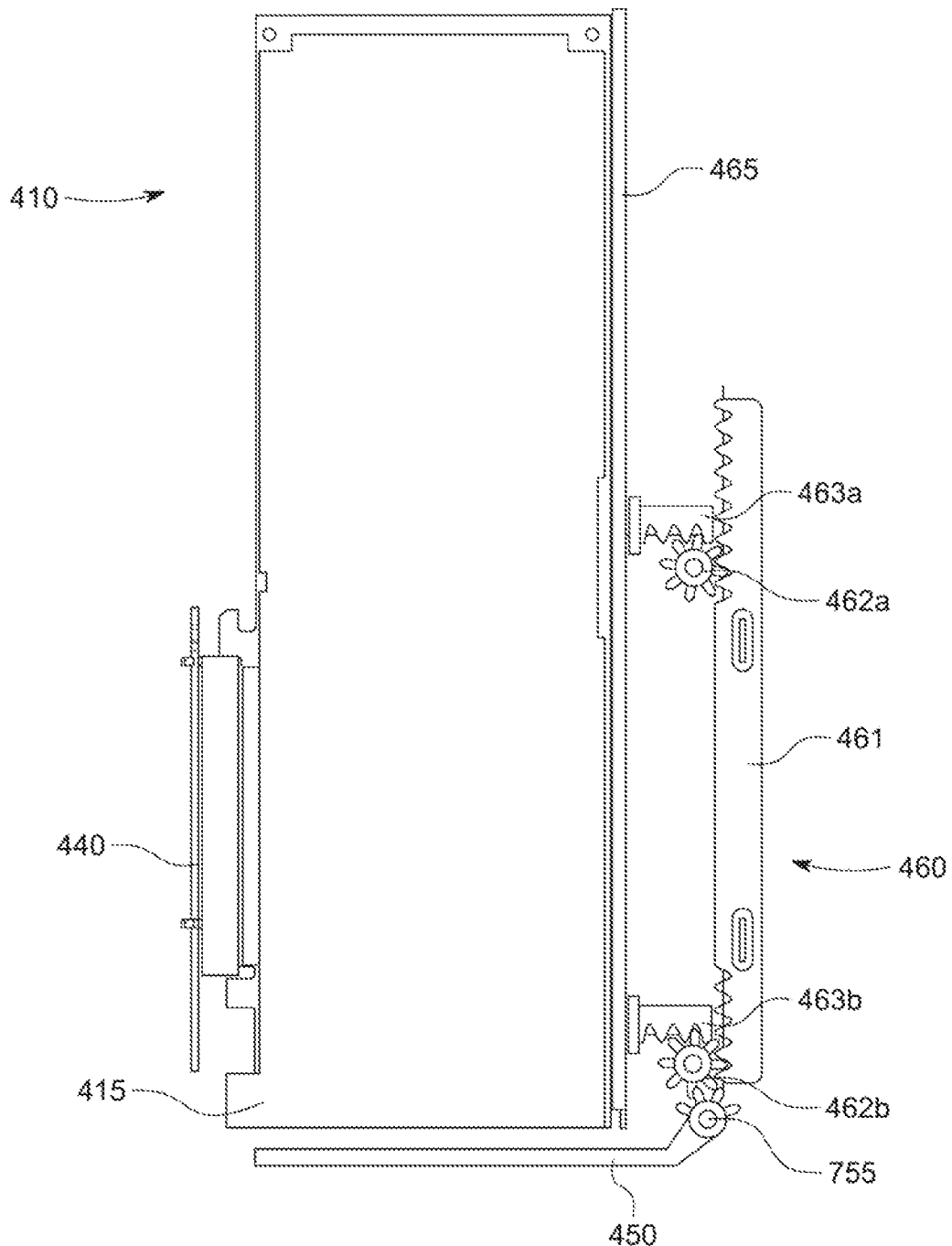
FIG. 7 is a top view of the adapter card module and the gear assembly with the adapter card module fully inserted into the chassis with the adapter card secured and docked, according to some implementations of the present disclosure.

FIG. 7 is a simplified top view of the adapter card module 410 and the gear assembly 460 of FIG. 6, with the adapter card module 410 fully inserted into a chassis such that the adapter card 415 is secured and docked following actuation of the rotating lever 450 to a locked or closed position. Following rotation of the lever 450 about the pin connection 755, the second gear rack(s), such as gear racks 463a, 463b, are fully extended in direction B away from the elongated gear rack 461. This causes the aligned electrical interface 416 (see FIG. 6) of the adapter card 415 to hot plug into a riser card 440, or a similar connector connected to the motherboard.

In some implementations, the described gear assembly 460 can further be used to remove an adapter card module 410. For example, the lever mechanism, such as rotating lever 450, can be actuated to an unlocked or open position that causes the gear assembly to move gear racks 463a, 463b in a direction opposite direction B and decouple the adapter card from the connector to the motherboard, such as riser card 440. Once the adapter card 415 is decoupled, the guide rail 470 can be slid along the guide rail receiver 465 in the direction opposite direction A (see FIG. 4). This allows the adapter card module 410 to translate from the fully inserted position to a position protruding the exterior of the computer chassis, thereby allowing the easy removal or replacement of the adapter card module.

The illustrated aspects described above for FIGS. 1 to 7 are primarily in the context of adapter cards and adapter card modules being secured into a chassis of a computer device and providing a dock or hot plug to a motherboard. However, the described lever and gear assembly mechanisms are applicable to other adapter modules for a computer device. The described gear assembly mechanism and method of engaging and disengaging an adapter card from a connection to a motherboard of a computer device is similarly contemplated as having been presented by way of example only, and not limitation, and can include different combinations of the described elements.

While various embodiments of the present invention have been described above, it should be understood that they have been presented by way of example only, and not limitation. Numerous changes to the disclosed embodiments can be made in accordance with the disclosure herein without departing from the spirit or scope. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A gear assembly for securing an adapter card in a computer chassis, the gear assembly comprising:
   a guide rail receiver configured to receive a guide rail coupled to an adapter card module for docking an adapter card to an electrical connector to a motherboard;
   a gear system coupled to the guide rail, the gear system including an elongated first gear rack meshed with one or more pinion gears, the one or more pinion gears each meshed with one or more second gear racks positioned perpendicular to the first gear rack; and
   a lever coupled to the gear system, the lever including an open position to allow the adapter card module to be inserted and removed from the computer chassis and a closed position,
   wherein moving the lever from the open position to the closed position causes the one or more pinion gears to rotate and drive the one or more second gears to dock an adapter card to the electrical connector.

2. The gear assembly of claim 1, wherein the adapter card is positioned horizontally during the docking of the adapter card module to the guide rail.

3. The gear assembly of claim 1, wherein the electrical connecter to the motherboard is an expansion slot.

4. The gear assembly of claim 1, wherein the electrical connecter to the motherboard is a riser board.

5. The gear assembly of claim 1, wherein the adapter card module includes a bracket for holding the adapter card and for connecting the guide rail to the adapter card module.

6. The gear assembly of claim 1, wherein one or more of the second gear racks are coupled to the guide rail receiver.

7. The gear assembly of claim 1, wherein the lever is coupled to the gear system via gear teeth disposed at a pinned end of the lever that engage the gear system.

8. A method for docking an adapter card to a motherboard in a computer chassis, the method comprising:
   placing a guide rail disposed on the side of an adapter card module in a guide rail receiver secured to a gear assembly;
   sliding the guide rail in a first direction along the guide rail receiver such that the adapter card module translates from a first position at least partially on an exterior of the computer chassis to a second position fully within the computer chassis, such that an electrical connector of an adapter card in the adapter card module is positioned adjacent a connector to a motherboard; and
   rotating a lever mechanism coupled to the gear assembly to translate the adapter card to a locked position coupling the adapter card with the connector to the motherboard,
   wherein the translation of the adapter card to the locked position includes an elongated first gear rack rotating one or more pinion gears meshed with one or more second gear racks positioned perpendicular to the first gear rack.

9. The method of claim 8, furthering comprising rotating the lever mechanism to an unlocked position decoupling the adapter card from the connector to the motherboard.

10. The method of claim 9, further comprising sliding the guide rail in a second opposite direction along the guide rail receiver such that the adapter card module translates from the second position to a third position allowing removal of the adapter card module from the computer chassis.

11. The method of claim 8, wherein the adapter card is positioned horizontally during the sliding of guide rail along the guide rail receiver.

12. The method of claim 8, wherein the coupling of the adapter card to the motherboard is via an expansion slot.

13. The method of claim 8, the coupling of the adapter card to the motherboard is via a riser board.

14. The method of claim 8, wherein the adapter card module includes a bracket for holding the adapter card and for connecting the guide rail to the adapter card module.

15. The method of claim 8, wherein one or more of the second gear racks are coupled to the guide rail receiver.

16. The method of claim 8, wherein the lever mechanism is coupled to the gear assembly by gear teeth disposed at a pinned end of the lever mechanism that engage the gear assembly.

* * * * *